(12) United States Patent
Shimasaki et al.

(10) Patent No.: US 6,186,255 B1
(45) Date of Patent: Feb. 13, 2001

(54) HYBRID VEHICLE

(75) Inventors: Yuichi Shimasaki; Kenji Nakano; Hironao Fukuchi; Hideyuki Takahashi; Kazutomo Sawamura; Teruo Wakashiro, all of Wako (JP)

(73) Assignee: Honda Giken Kogyo Kabushiki Kaisha, Tokyo (JP)

(*) Notice: Under 35 U.S.C. 154(b), the term of this patent shall be extended for 0 days.

(21) Appl. No.: 09/179,631

(22) Filed: Oct. 27, 1998

(30) Foreign Application Priority Data

Oct. 27, 1997 (JP) .................................................. 9-293732

(51) Int. Cl.[7] .................................................. B60K 1/00
(52) U.S. Cl. .................................................. 180/65.3
(58) Field of Search .................................. 180/165, 65.2, 180/65.3, 65.4, 65.1, 65.6, 65.7, 65.8; 318/139, 146

(56) References Cited

U.S. PATENT DOCUMENTS

| | | |
|---|---|---|
| 4,194,417 | 3/1980 | Kato et al. . |
| 5,285,111 | 2/1994 | Sherman . |
| 5,939,848 * | 8/1999 | Yano et al. ........................... 318/139 |
| 6,019,183 * | 2/2000 | Shimasaki et al. ................... 180/165 |
| 6,020,697 * | 2/2000 | Shimasaki et al. ................... 318/140 |

FOREIGN PATENT DOCUMENTS 0 800 949 A2   10/1997  (EP) .

\* cited by examiner

Primary Examiner—Lanna Mai
Assistant Examiner—Kevin McKinley
(74) Attorney, Agent, or Firm—Armstrong, Westerman, Hattori, McLeland & Naughton

(57) ABSTRACT

A hybrid vehicle has a transmission coupled to the output shaft of an engine for transmitting an output power of the engine to drive wheels of the hybrid vehicle. A generator motor is coupled to the transmission for transmitting an assistive output power for assisting the output power of the engine through the transmission to the drive wheels. A battery stores electric energy regenerated by the generator motor, operating as an electric motor, from kinetic energy of the hybrid vehicle transmitted from the drive wheels through the transmission when the hybrid vehicle is decelerated. A transmission control unit establishes a speed reduction ratio for the transmission to achieve a predetermined regeneration efficiency for the generator motor when the hybrid vehicle is decelerated, and controls the transmission at the established speed reduction ratio.

7 Claims, 6 Drawing Sheets

HYBRID VEHICLE

BACKGROUND OF THE INVENTION

1. Field of the Invention

The present invention relates to a hybrid vehicle, and more particularly to a parallel hybrid vehicle.

2. Description of the Related Art

Generally known parallel hybrid vehicles have an internal combustion engine as a primary propulsive power unit and an electric motor, more accurately a generator motor which can also operate as an electric generator, for generating an assistive output power for assisting the output power produced by the engine. The output powers (mechanical powers) generated by the engine and the generator motor are transmitted through a transmission to drive wheels of the hybrid vehicle. If the transmission is a manual transmission, then a clutch mechanism is positioned between the engine and the transmission.

For accelerating the hybrid vehicle, the generator motor is controlled to generate an assistive output power, and both the output power produced by the engine and the assistive output power from the generator motor are transmitted to the drive wheels. Therefore, the power requirements for accelerating the hybrid vehicle can be met, and the output power produced by the engine may be relatively small, thus reducing fuel consumption by the engine and exhaust gases emitted from the engine.

When the hybrid vehicle is decelerated, a kinetic energy is transmitted from the drive wheels through the transmission to the generator motor to cause the generator motor to operate in a regenerative mode, and the electric energy generated by the generator motor is stored in an electric energy storage unit such as a battery used as a power supply for the electric energy.

When the generator motor operates in the regenerative mode upon deceleration of the hybrid vehicle, it is desirable that the kinetic energy of the vehicle be efficiently converted into electric energy for effective energy utilization.

On the conventional hybrid vehicles, the transmission for transmitting the kinetic energy of the vehicle from the drive wheels to the generator motor is manually operated by the driver for a desired gear position (manual transmission) or automatically operated for a desired gear position that matches the power requirements for acceleration or cruising (automatic transmission).

Upon operation of the generator motor in the regenerative mode when the hybrid vehicle is decelerated, the rotational speed of and the load on the generator motor may not be best suited to efficient regenerative operation of the generator motor, failing to convert the kinetic energy of the vehicle efficiently into electric energy.

SUMMARY OF THE INVENTION

It is therefore an object of the present invention to provide a hybrid vehicle which incorporates a control system capable of efficiently converting the kinetic energy of the hybrid vehicle upon deceleration thereof into electric energy for retrieval, and increasing the general energy efficiency of the hybrid vehicle in various modes of operation including those modes other than the deceleration of the hybrid vehicle.

To achieve the above object, there is provided in accordance with the present invention a hybrid vehicle comprising an engine for propelling the hybrid vehicle, the engine having an output shaft, a transmission coupled to the output shaft of the engine for transmitting an output power of the engine to drive wheels of the hybrid vehicle, a generator motor coupled to the transmission for transmitting an assistive output power for assisting the output power of the engine through the transmission to the drive wheels, electric energy storage means for storing electric energy regenerated by the generator motor from kinetic energy of the hybrid vehicle transmitted from the drive wheels through the transmission when the hybrid vehicle is decelerated, and transmission control means for establishing a speed reduction ratio for the transmission to achieve a predetermined regeneration efficiency for the generator motor when the hybrid vehicle is decelerated, and controlling the transmission at the established speed reduction ratio.

With the above arrangement, when the hybrid vehicle is decelerated, the transmission control means establishes a speed reduction ratio for the transmission to achieve a predetermined regeneration efficiency for the generator motor, and controls the transmission at the established speed reduction ratio. Therefore, the generator motor can operate as an electric motor to regenerate electric energy at a rotational speed and under a load for an optimum regeneration efficiency.

Consequently, the kinetic energy of the hybrid vehicle as it is decelerated can be converted efficiently into electric energy for retrieval by the generator motor operating as the electric motor.

Preferably, the transmission control means comprises means for bringing the transmission into a neutral position when the engine is idling.

Alternatively, the hybrid vehicle preferably further comprises clutch means for selectively transmitting power between the output shaft of the engine, and the transmission and the generator motor, and clutch control means for disengaging the clutch means when the engine is idling.

When the engine is idling, the load on the engine is thus reduced, and hence the fuel consumption by the engine is lowered.

The clutch control means preferably comprises means for disengaging the clutch means when the hybrid vehicle is decelerated.

Alternatively, the hybrid vehicle preferably further comprises clutch means for selectively transmitting power between the output shaft of the engine, and the transmission and the generator motor, and clutch control means for disengaging the clutch means when the hybrid vehicle is decelerated.

If the clutch means were engaged when the hybrid vehicle is decelerated, part of the kinetic energy of the hybrid vehicle would be consumed by engine braking of the engine. However, when the clutch means is disengaged by the clutch control means upon deceleration of the hybrid vehicle, a greater amount of the kinetic energy of the hybrid vehicle is transmitted to the generator motor. Therefore, the efficiency with which the kinetic energy of the hybrid vehicle upon deceleration of the hybrid vehicle is converted into electric energy (regenerated electric power) by the generator motor is increased.

The transmission control means preferably comprises means for establishing a speed reduction ratio for the transmission to achieve a predetermined energy efficiency for the engine or a predetermined energy efficiency for the generator motor operating as an electric motor to generate the assistive output power, when the hybrid vehicle is running without deceleration, and controlling the transmission at the established speed reduction ratio.

With this arrangement, it is possible to operate the engine and the generator motor at a rotational speed and under a load for an optimum energy efficiency when the hybrid vehicle is running without deceleration, e.g., when the hybrid vehicle is accelerated. Consequently, the hybrid vehicle can run with an optimum energy efficiency while reducing fuel consumption by the engine and electric power consumption by the generator motor.

The hybrid vehicle preferably further comprises rotation transfer transmission means connected between the output shaft of the engine and the generator motor, for transmitting rotation between the output shaft of the engine and the generator motor at a speed reduction ratio for operating the engine and the generator motor in a rotational speed range to achieve predetermined energy efficiencies for the engine and the generator motor, when the transmission is controlled to operate to achieve a predetermined energy efficiency for the engine or a predetermined energy efficiency for the generator motor when the hybrid vehicle is running without deceleration.

Since the output shaft of the engine and the generator motor are connected to each other by the rotation transfer transmission means, when the transmission is controlled to operate to achieve a predetermined energy efficiency for the engine or a predetermined energy efficiency for the generator motor when the hybrid vehicle is running without deceleration, the engine and the generator motor can be operated in a rotational speed range to achieve predetermined energy efficiencies for the engine and the generator motor.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
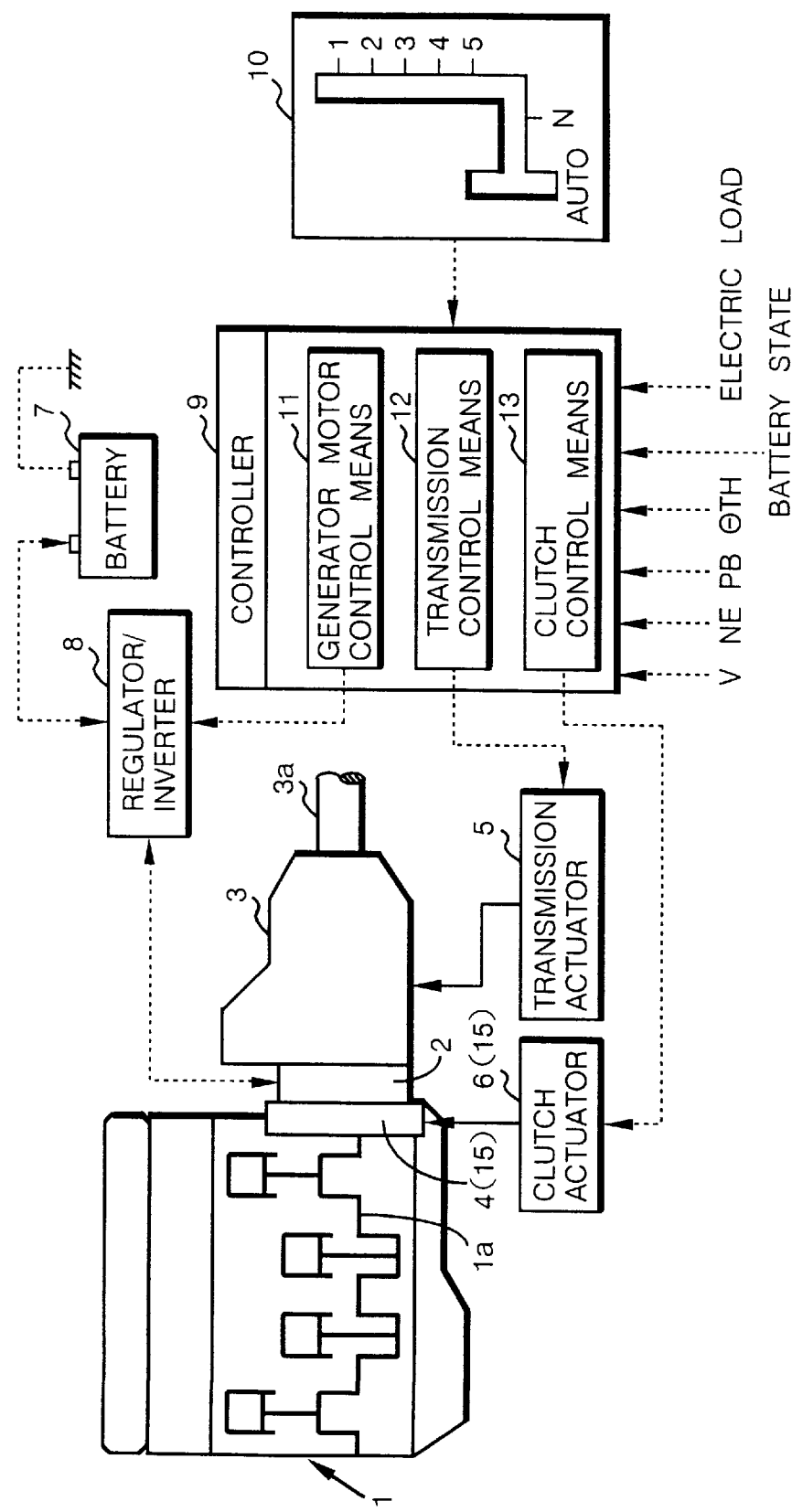
FIG. 1 is a block diagram of a system arrangement of a hybrid vehicle according to an embodiment of the present invention.

As shown in FIG. 1, a hybrid vehicle according to an embodiment of the present invention has a internal combustion engine 1, a generator motor 2, and a transmission 3. The engine 1 has a crankshaft 1a as an output shaft coupled through a clutch mechanism 4 coaxially to a rotatable shaft (not shown) of the generator motor 2. The rotatable shaft of the generator motor 2 is connected to an input shaft of the transmission 3 whose output drive shaft 3a is operatively connected to drive wheels of the hybrid vehicle through a differential gear mechanism (not shown).

When the clutch mechanism 4 is engaged, the output power of the engine 1 is transmitted through the rotatable shaft of the generator motor 2 and the transmission 3 to the drive wheels, thereby propelling the hybrid vehicle. While the hybrid vehicle is running, the generator motor 2 operates as an electric motor to generate an assistive output power for assisting the output power produced by the engine 1. The generated assistive output power and the output power produced by the engine 1 are transmitted through the transmission 3 to the drive wheels.

The transmission 3 is operated to change its gear position by a transmission actuator 5 which comprises a hydraulic pump and a hydraulic circuit (not shown). Similarly, the clutch mechanism 4 is operated for engagement and disengagement by a hydraulic clutch actuator 6.

The hybrid vehicle has, in addition to its mechanism arrangement described above, an electric arrangement described below.

The hybrid vehicle has a battery 7 (electric energy storage means) which serves as a power supply for the generator motor 2 when it operates as the electric motor, a regulator/inverter 8 for transmitting electric energy between the battery 7 and the generator motor 2, and a controller 9 comprising a microcomputer or the like.

The controller 9 is supplied with various data of a vehicle speed V, a rotational speed NE of the engine 1, an intake air pressure PB, a throttle valve operation quantity θTH, an energy storage state (remaining capacity) of the battery 7, and an electric load on the battery 7 from corresponding sensors (not shown). The controller 9 is also supplied with data indicative of the gear position, selected by the driver of the hybrid vehicle, of a gear shift lever (not shown) of a gear shift lever device 10 coupled to the transmission 3. The gear shift lever device 10 has a pattern of gear positions as shown which allows the driver to select a manual mode, indicated by gear positions "1"–"5", for manually achieving a desired speed reduction ratio for the transmission 3 with the gear shift lever, and an automatic mode, indicated by "AUTO", for automatically achieving an appropriate speed reduction ratio for the transmission 3. The pattern of gear positions also includes a gear position "N" which corresponds to the neutral position of the transmission 3.

The controller 9 has, as its functions, a generator motor control means 11 for controlling the generator motor 2 through the regulator/inverter 8, a transmission control means 12 for controlling the transmission 3 through the transmission actuator 5, and a clutch control means 13 for controlling the clutch mechanism 4 through the clutch actuator 6.

The generator motor control means 11 controls the regulator/inverter 8 to operate the generator motor 2 as an electric motor with electric energy supplied from the battery 7 when the hybrid vehicle is accelerated, and also controls the regulator/inverter 8 to operate the generator motor 2 as an electric generator for regenerating electric energy to be stored in the battery 7, i.e., to charge the battery 7 when the hybrid vehicle is decelerated.

The transmission control means 12 controls the transmission actuator 5 to operate the transmission 3 at a speed reduction ratio represented by a gear position that is manually selected by the gear shift lever of the gear shift lever device 10 when it is in the manual mode, and also controls the transmission actuator 5 to operate the transmission 3 at a speed reduction ratio automatically selected when the gear shift lever of the gear shift lever device 10 is in the automatic mode.

The clutch control means 13 controls the clutch actuator 6 to disengage the clutch mechanism 4 when the engine 1 is idling, i.e., when the hybrid vehicle is parked, or when the hybrid vehicle is decelerated.

The clutch mechanism 4 and the clutch actuator 6 jointly make up a clutch means 15.

Operation of the hybrid vehicle according to the embodiment shown in FIG. 1 will be described below.

Figure 2:
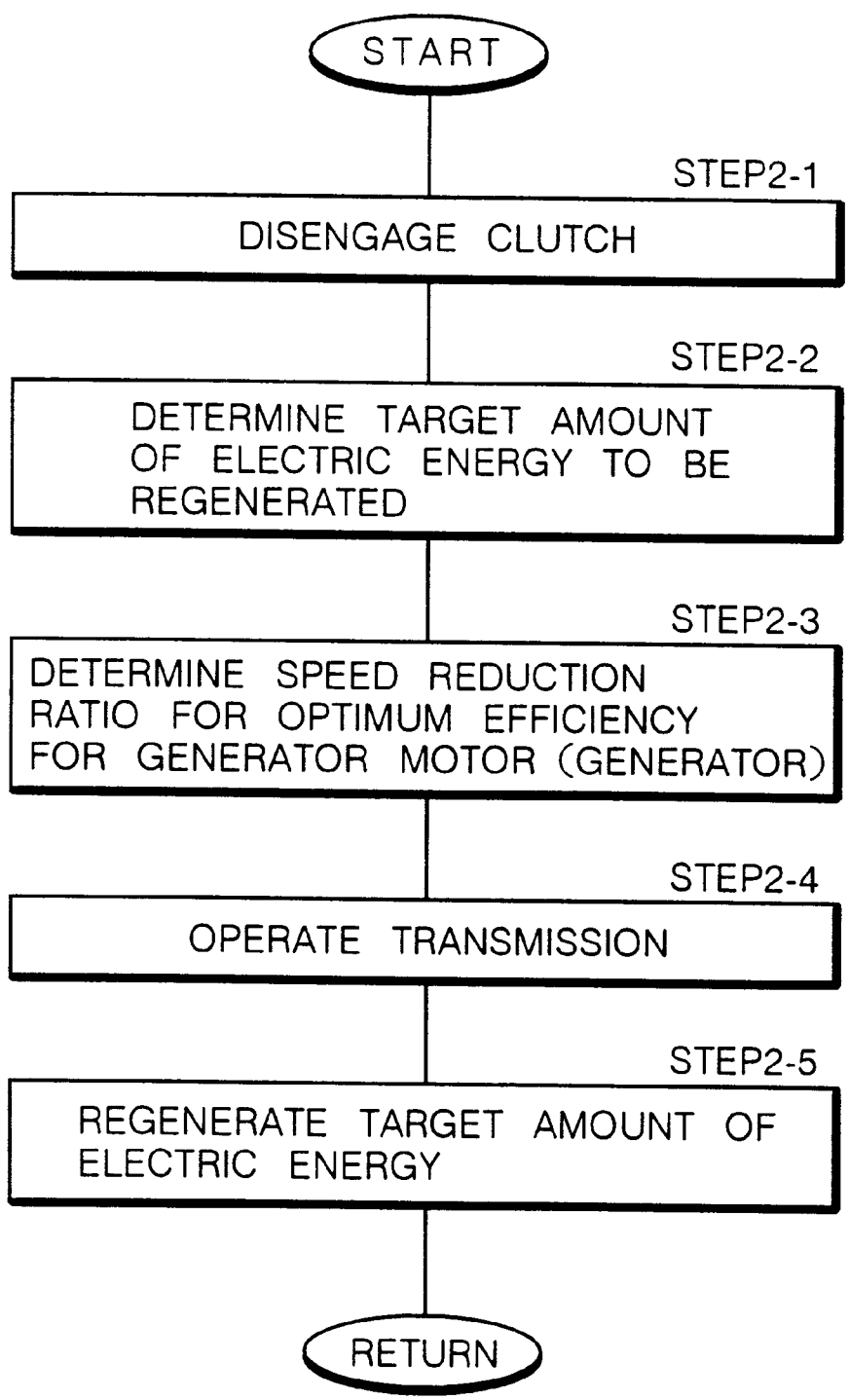
FIG. 2 is a flowchart of an operation sequence of the hybrid vehicle shown in FIG. 1 upon deceleration thereof.

FIG. 2 shows an operation sequence of the hybrid vehicle shown in FIG. 1 upon deceleration thereof for regenerating electric energy with the generator motor 2. Whether the hybrid vehicle is decelerated or not is determined by detecting the throttle valve operation quantity θTH or a braking action on the hybrid vehicle, for example.

As shown in FIG. 2, the clutch control means 13 of the controller 9 gives a disengagement command for the clutch mechanism 4 to the clutch actuator 6, which then disengages the clutch mechanism 4 in STEP 2-1. The generator motor 2 and the transmission 3 are disconnected from the engine 1, and the generator motor 2 is now rotated by the kinetic energy of the hybrid vehicle which is transmitted from the drive wheels through the transmission 3. At this time, the rotational speed of the generator motor 2 depends on the vehicle speed V of the hybrid vehicle and the speed reduction ratio of the transmission 3.

Then, the generator motor control means 11 of the controller 9 determines a target amount of electric energy to be regenerated by the generator motor 2 operating as the electric generator, using a predetermined map or formula, based on the vehicle speed V, the energy storage state (remaining capacity) of the battery 7, and the electric load on the battery 7 in STEP 2-2.

Thereafter, the transmission control means 12 of the controller 9 determines a speed reduction ratio of the transmission 3 for optimizing an energy efficiency (the ratio of the electric energy generated by the generator motor 2 to the mechanical energy supplied to the generator motor 2) for the generator motor 2 to regenerate the target amount of electric energy, using a predetermined map, based on the vehicle speed V and the determined target amount of electric energy in STEP 2-3.

Figure 3:
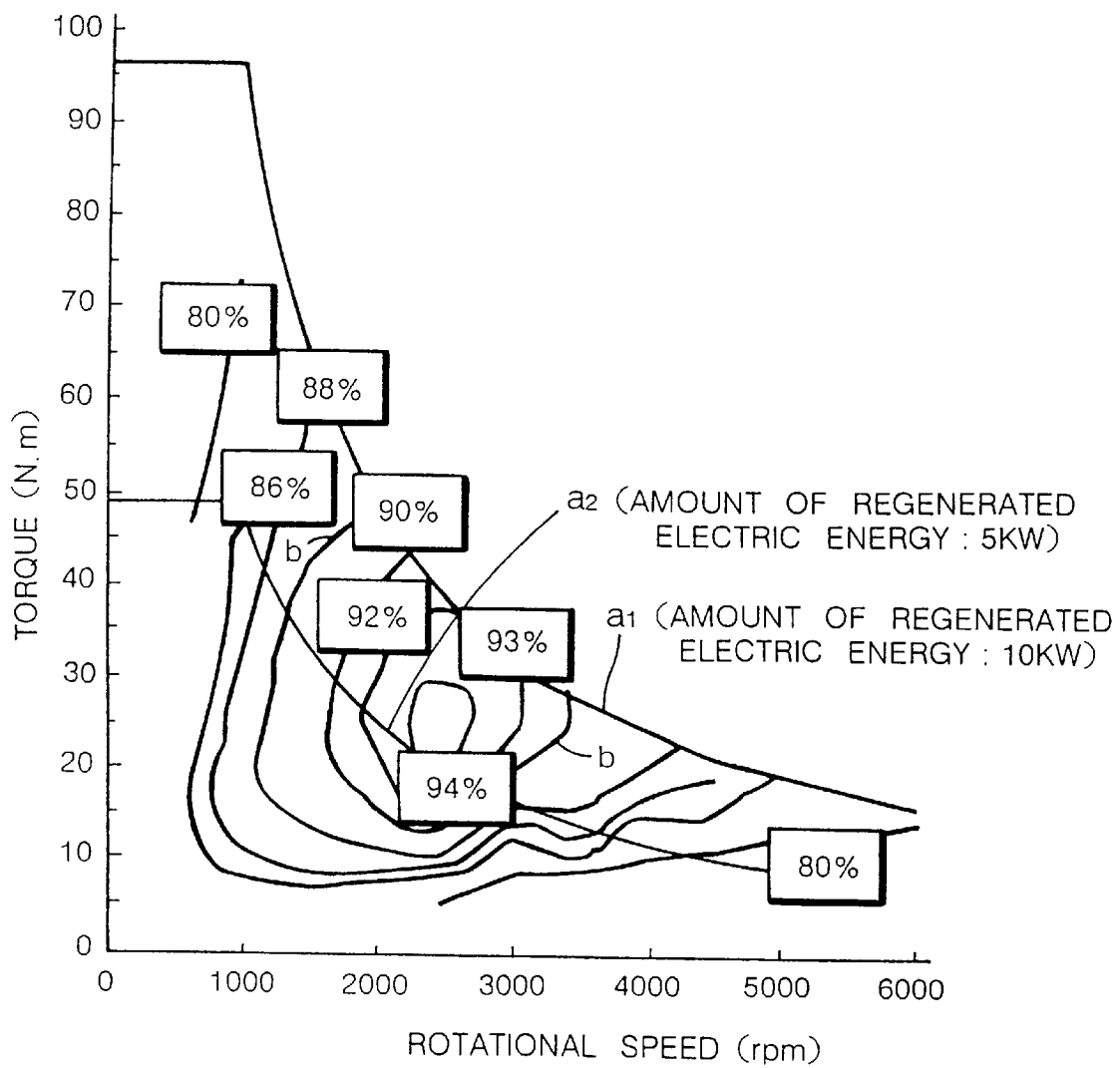
FIG. 3 is a diagram of operation characteristics of a generator motor, operating as an electric generator, on the hybrid vehicle shown in FIG. 1.

More specifically, in FIG. 3, curves a1, a2 represent relationships between the rotational speed of the generator motor 2 and the torque thereof when the amount of electric energy regenerated by the generator motor 2 is 10 kW (constant) and 5 kW (constant), respectively, and a plurality of contour-line-like curves b are constant-efficiency curves (which represent operating points where the energy efficiency of the generator motor 2 is constant) of the generator motor 2. As shown in FIG. 3, if 10 kW is regenerated by the generator motor 2, for example, then the energy efficiency of the generator motor 2 is maximum (about 93%) when the rotational speed of the generator motor 2 is about 3000 rpm. Therefore, if the target amount of electric energy to be regenerated by the generator motor 2 is determined to be 10 kW in STEP 2-2, then the speed reduction ratio of the transmission 3 is determined to equalize the rotational speed of the generator motor 2 to about 3000 rpm or a value in the vicinity thereof.

As described above, in STEP 2-3, the speed reduction ratio of the transmission 3 is determined to operate the generator motor 2 at a rotational speed for optimizing the energy efficiency of the generator motor 2.

Then, the transmission control means 12 indicates the speed reduction ratio determined in STEP 2-3 to the transmission actuator 5, which then operates the transmission 3 according to the indicated speed reduction ratio in STEP 2-4.

Thereafter, the generator motor control means 11 enables the regulator/inverter 8 to control a current flowing through the generator motor 2 for causing the generator motor 2 to regenerate the target amount of electric energy determined in STEP 2-2 in STEP 2-5. The regenerated electric energy is stored or retrieved in the battery 7.

The above operation of the hybrid vehicle when it is decelerated is carried out when the automatic mode is selected by the gear shift lever device 10. In the manual mode, the processing in STEP 2-3, 2-4 is omitted. In the manual mode, the transmission control means 12 controls the transmission actuator 5 to operate the transmission 3 according to a speed reduction ratio that is manually selected by the gear shift lever device 10.

As described above, when the generator motor 2 regenerates electric energy upon deceleration of the hybrid vehicle, the speed reduction ratio of the transmission 3 is automatically controlled to optimize the energy efficiency of the generator motor 2. Accordingly, the kinetic energy of the hybrid vehicle can efficiently be converted by the generator motor 2 into electric energy, which is stored in the battery 7.

Since the clutch mechanism 4 is disengaged at this time, the kinetic energy of the hybrid vehicle is not consumed by the engine 1, but transmitted to the generator motor 2 and efficiently converted by the generator motor 2 into electric energy for retrieval in the battery 7.

Figure 4:
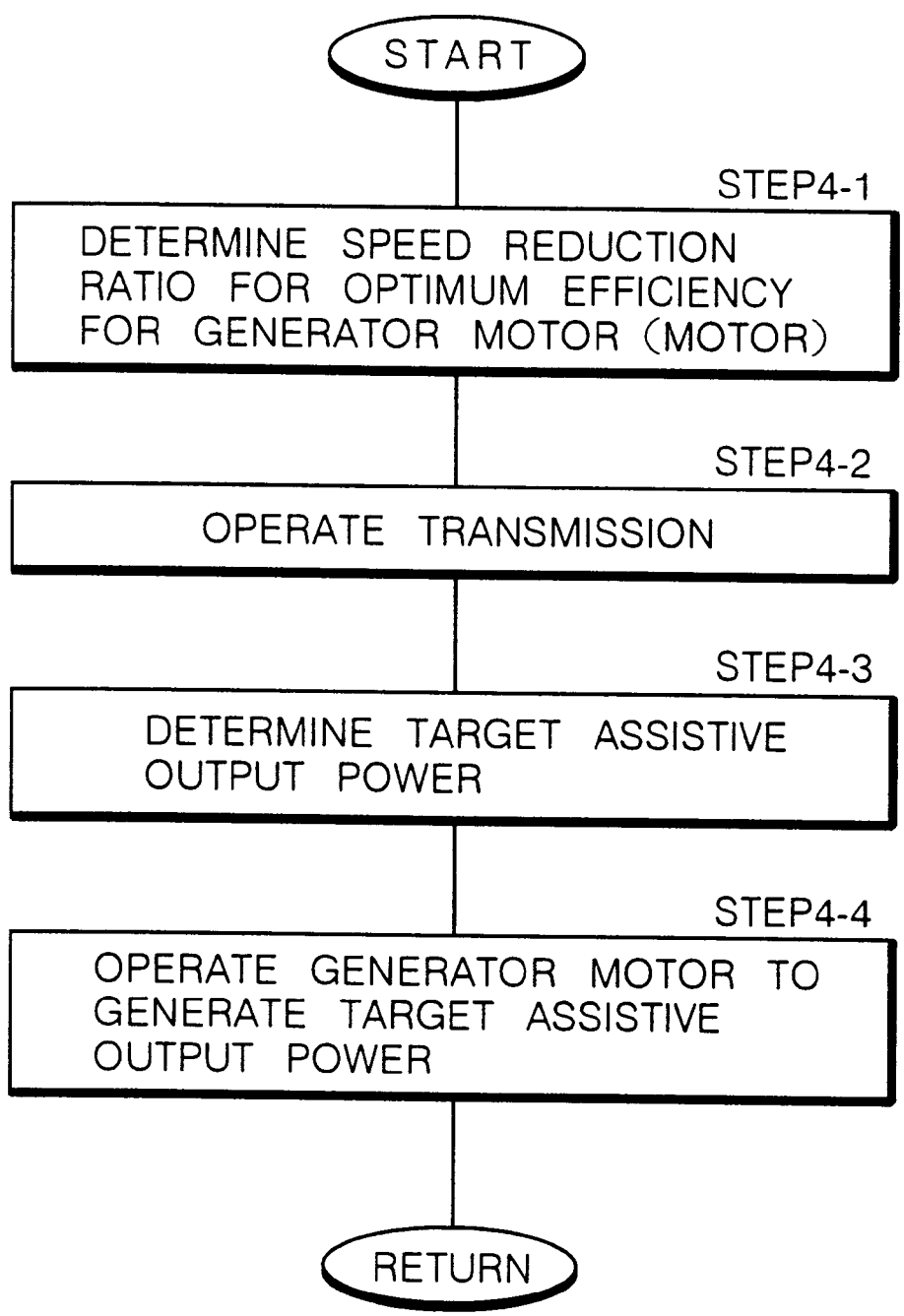
FIG. 4 is a flowchart of an operation sequence of the hybrid vehicle shown in FIG. 1 upon acceleration thereof.

FIG. 4 shows an operation sequence of the hybrid vehicle shown in FIG. 1 upon acceleration thereof for operating the generator motor 2 as an electric motor. Whether the hybrid vehicle is accelerated or not is determined by detecting a rate of change in the throttle valve operation quantity θTH, for example.

As shown in FIG. 4, the controller 9 determines a speed reduction ratio of the transmission 3 to operate the generator motor 2 as an electric motor at a rotational speed for optimizing an energy efficiency (the ratio of the mechanical energy outputted from the generator motor 2 to the electric energy supplied to the generator motor 2) for the generator motor 2 as the electric motor, based on the vehicle speed V in STEP 4-1.

Figure 5:
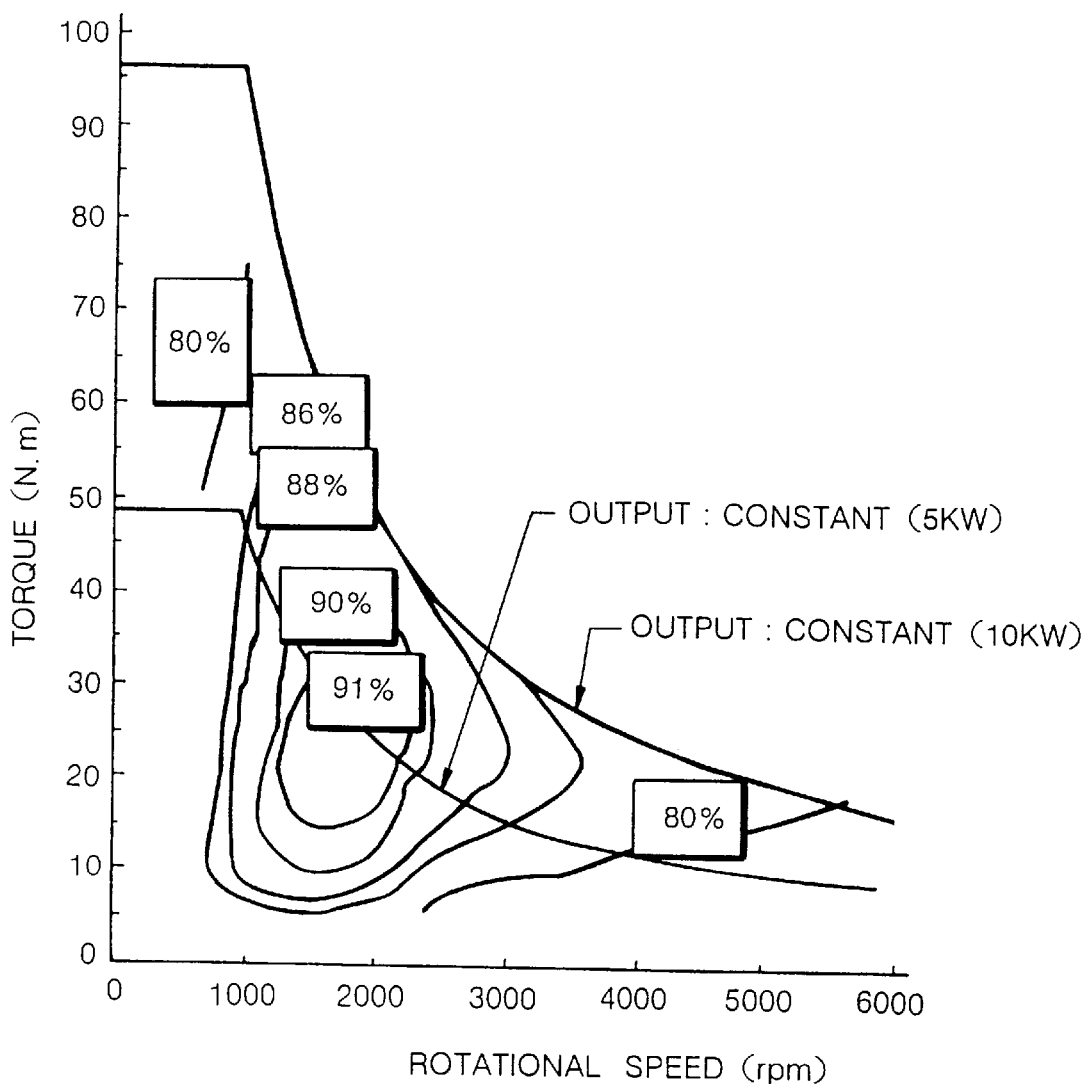
FIG. 5 is a diagram of operation characteristics of the generator motor, operating as an electric motor, on the hybrid vehicle shown in FIG. 1.

More specifically, FIG. 5 shows operation characteristics of the generator motor 2, operating as the electric motor, similar to the operation characteristics shown in FIG. 3. As shown in FIG. 5, the energy efficiency of the generator motor 2 as the electric motor is optimum when the rotational speed thereof is about 2000 rpm. Therefore, the speed reduction ratio of the transmission 3 is determined to operate the generator motor 2 at the rotational speed of about 2000 rpm or a value in the vicinity thereof in STEP 4-1.

Then, the transmission control means 12 indicates the speed reduction ratio determined in STEP 4-1 to the transmission actuator 5, which then operates the transmission 3 according to the indicated speed reduction ratio in STEP 4-2. The generator motor 2 now rotates in a rotational speed range in which it operates as the electric motor with an optimum energy efficiency.

The generator motor control means 11 determines a target assistive output power to be generated by the generator motor 2, using a predetermined map or formula, based on the rotational speed NE of the engine 1, the intake air pressure PB, the throttle valve operation quantity θTH, the energy storage state (remaining capacity) of the battery 7, and the electric load on the battery 7 in STEP 4-3.

Thereafter, the generator motor control means 11 enables the regulator/inverter 8 to control a current flowing through the generator motor 2 for causing the generator motor 2 to generate the target assistive output power determined in STEP 4-3 in STEP 4-4. At this time, the assistive output power generated by the generator motor 2 and the output power produced by the engine 1 are transmitted through the transmission 3 to the drive wheels of the hybrid vehicle to accelerate the hybrid vehicle as desired.

The above operation of the hybrid vehicle when it is accelerated is carried out when the automatic mode is selected by the gear shift lever device 10. In the manual mode, the processing in STEP 4-1, 4-2 is omitted. In the manual mode, the transmission control means 12 controls the transmission actuator 5 to operate the transmission 3 according to a speed reduction ratio that is manually selected by the gear shift lever device 10.

As described above, when the generator motor 2 generates an assistive output power upon acceleration of the hybrid vehicle, the speed reduction ratio of the transmission 3 is automatically controlled to optimize the energy efficiency of the generator motor 2. Accordingly, the assistive output power can efficiently be generated by the generator motor 2 for accelerating the hybrid vehicle as desired.

Insofar as the automatic mode is selected by the gear shift lever device 10, when the engine 1 is idling while the hybrid vehicle is being parked, for example, the controller 9 operates as follows:

The clutch control means 13 of the controller 9 gives a disengagement command for the clutch mechanism 4 to the clutch actuator 6, which then disengages the clutch mechanism 4.

Since the clutch mechanism 4 is disengaged, the load on the engine 1 is minimized, reducing fuel consumption by the engine 1 upon idling thereof.

In this embodiment, when the hybrid vehicle is accelerated, the transmission 3 is controlled to operate in order to optimize the energy efficiency of the generator motor 2. However, the transmission 3 may be controlled to operate in order to optimize the energy efficiency of the engine 1. According to this modification, a speed reduction ratio of the transmission 3 may be determined to operate the engine 1 at a rotational speed to optimize the energy efficiency thereof, based on the vehicle speed V in view of the energy efficiency characteristics of the engine 1 in STEP 4-1 shown in FIG. 4.

Alternatively, the transmission 3 may be controlled to operate in order to relatively optimize the energy efficiency of both the generator motor 2 and the engine 1. According to this modification, a speed reduction ratio of the transmission 3 may be determined to operate the engine 1 and the generator motor 2 at a rotational speed intermediate between the rotational speed at which the energy efficiency of the engine 1 is optimum and the rotational speed at which the energy efficiency of the generator motor 2 as the electric motor is optimum.

Figure 6:
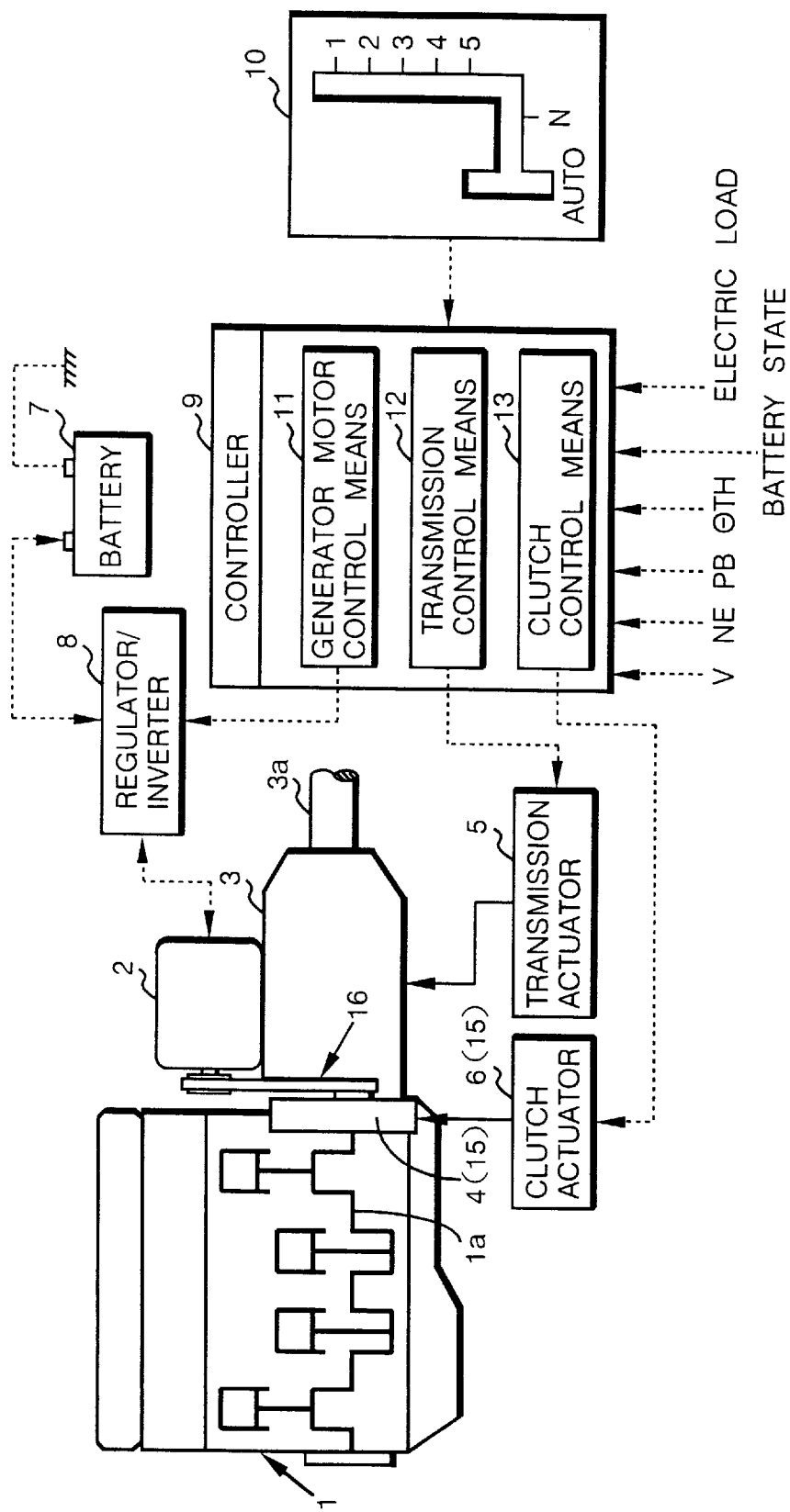
FIG. 6 is a block diagram of a system arrangement of a hybrid vehicle according to another embodiment of the present invention.

A hybrid vehicle according to another embodiment of the present invention will be described below with reference to FIG. 6. FIG. 6 shows a system arrangement of the hybrid vehicle according to the other embodiment of the present invention. Those parts shown in FIG. 6 which are identical to those shown in FIG. 1 are denoted by identical reference numerals, and will not be described in detail below.

The hybrid vehicle according to the embodiment shown in FIG. 6 differs from the hybrid vehicle according to the embodiment shown in FIG. 1 only as to a coupling structure between the generator motor 2 and the transmission 3, i.e., only in that the rotatable shaft of the generator motor 2 is coupled to the input shaft of the transmission 3 by a rotation transfer transmission means 16 behind the clutch mechanism 4. The rotation transfer transmission means 16, which comprises a belt and pulley mechanism, for example, transfers rotation between the engine 1 and the generator motor 2 such that the ratio of the rotational speed of the engine 1 to the rotational speed of the generator motor 2 is 1:3, for example, i.e., the rotational speed of the generator motor 2 is three times the rotational speed of the engine 1, when the clutch mechanism 4 is engaged.

Other details of the hybrid vehicle according to the embodiment shown in FIG. 6 are identical to those of the hybrid vehicle according to the embodiment shown in FIG. 1.

On the hybrid vehicle according to the embodiment shown in FIG. 6, the transmission 3, the clutch mechanism 4, and the generator motor 2 operate in the same manner as those on the hybrid vehicle according to the embodiment shown in FIG. 1 when the hybrid vehicle is decelerated and accelerated, and also when the engine 1 is idling. Therefore, the hybrid vehicle according to the embodiment shown in FIG. 6 offers the same advantages as those of the hybrid vehicle according to the embodiment shown in FIG. 1.

Furthermore, the hybrid vehicle according to the embodiment shown in FIG. 6 offers additional advantages, as described below, because the rotational speed of the generator motor 2 is three times the rotational speed of the engine 1 when the clutch mechanism 4 is engaged.

Generally, the rotational speed of the generator motor 2 at which the energy efficiency of the generator motor 2 operating as the electric motor is relatively good is higher than the rotational speed of the engine 1 at which the energy efficiency of the engine 1 is relatively good. The rotational speed of the generator motor 2 operating as the electric motor is about three times the rotational speed of the engine 1, for example.

Therefore, when the speed reduction ratio of the transmission 3 is controlled to operate the generator motor 2 as the electric motor at a rotational speed for its optimum energy efficiency at the time the hybrid vehicle is accelerated (see FIG. 4), the engine 1 is also operated at a rotational speed for its optimum energy efficiency. Consequently, when the hybrid vehicle is accelerated, both the generator motor 2 as the electric motor and the engine 1 are operated efficiently for desired acceleration performance.

In the embodiment shown in FIG. 6, the speed reduction ratio achieved between the rotational speeds of the engine 1 and the generator motor 2 by the rotation transfer transmission means 16 is constant. However, the rotation transfer transmission means 16 may comprise a continuously variable transmission, for example, so as to be able to adjust the speed ratio thereof for operating both the generator motor 2 as the electric motor and the engine 1 efficiently while the transmission 3 is being controlled upon acceleration of the hybrid vehicle.

In each of the above embodiments, the clutch mechanism 4 is disengaged when the engine 1 is idling. However, when the engine 1 is idling, the transmission 3 may automatically be brought into a neutral position by the transmission actuator 5. In this manner, when the engine 1 is idling, the load on the engine 1 may also be lowered to minimize the fuel consumption by the engine 1.

In each of the above embodiments, the hybrid vehicle has the clutch mechanism 4. However, the clutch mechanism 4 may be dispensed with, and the crankshaft 1a of the engine 1 may be coupled to the generator motor 2 and the transmission 3 at all times, so that the processing in STEP 2-1 may be omitted upon deceleration of the hybrid vehicle. According to this modification, when the hybrid vehicle is decelerated, the speed reduction ratio of the transmission 3 may be controlled to operate the generator motor 2 to regenerate electric energy with optimum energy efficiency.

If the hybrid vehicle does not have the clutch mechanism 4, then when the engine 1 is idling, the transmission 3 may automatically be brought into a neutral position to reduce the load on the engine 1.

In each of the above embodiments, the battery 7 is used as an electric energy storage means. However, a large-capacity capacitor such as an electric double-layer capacitor may be used as an electric energy storage means.

Although certain preferred embodiments of the present invention have been shown and described in detail, it should be understood that various changes and modifications may be made therein without departing from the scope of the appended claims.

What is claimed is:

1. A hybrid vehicle comprising:
   an engine for propelling the hybrid vehicle, said engine having an output shaft;
   a transmission coupled to said output shaft of the engine for transmitting an output power of said engine to drive wheels of the hybrid vehicle;
   a generator motor coupled to said transmission for transmitting an assistive output power for assisting the output power of said engine through said transmission to the drive wheels;
   electric energy storage means for storing electric energy regenerated by said generator motor from kinetic energy of the hybrid vehicle transmitted from the drive wheels through said transmission when the hybrid vehicle is decelerated; and
   transmission control means for establishing a speed reduction ratio for said transmission to achieve a predetermined regeneration efficiency for said generator motor when the hybrid vehicle is decelerated, and controlling said transmission at the established speed reduction ratio.

2. A hybrid vehicle according to claim 1, wherein said transmission control means comprises means for bringing said transmission into a neutral position when said engine is idling.

3. A hybrid vehicle according to claim 1, further comprising:
   clutch means for selectively transmitting power between said output shaft of the engine, and said transmission and said generator motor; and
   clutch control means for disengaging said clutch means when said engine is idling.

4. A hybrid vehicle according to claim 1 or 2, further comprising:
   clutch means for selectively transmitting power between said output shaft of the engine, and said transmission and said generator motor; and
   clutch control means for disengaging said clutch means when the hybrid vehicle is decelerated.

5. A hybrid vehicle according to claim 1, wherein said transmission control means comprises means for establishing a speed reduction ratio for said transmission to achieve a predetermined energy efficiency for said engine or a predetermined energy efficiency for said generator motor operating as an electric motor to generate said assistive output power, when the hybrid vehicle is running without deceleration, and controlling said transmission at the established speed reduction ratio.

6. A hybrid vehicle according to claim 3, wherein said clutch control means comprises means for disengaging said clutch means when the hybrid vehicle is decelerated.

7. A hybrid vehicle according to claim 5, further comprising:
   rotation transfer transmission means connected between said output shaft of the engine and said generator motor, for transmitting rotation between said output shaft of the engine and said generator motor at a speed reduction ratio for operating said engine and said generator motor in a rotational speed range to achieve predetermined energy efficiencies for said engine and said generator motor, when said transmission is controlled to operate to achieve a predetermined energy efficiency for said engine or a predetermined energy efficiency for said generator motor when the hybrid vehicle is running without deceleration.

* * * * *